Dec. 19, 1933.  W. O. KREBS  1,940,256
INDUCTION FURNACE
Filed May 6, 1932

INVENTOR
Walter O. Krebs.
BY
ATTORNEY.

Patented Dec. 19, 1933

1,940,256

UNITED STATES PATENT OFFICE 1,940,256

INDUCTION FURNACE

Walter O. Krebs, Youngstown, Ohio, assignor to
The Youngstown Sheet and Tube Company,
Youngstown, Ohio, a corporation of Ohio Application May 6, 1932. Serial No. 609,562

3 Claims. (Cl. 13—21)

The present invention relates to an improved form of coreless induction furnace adapted for the melting and/or refining of a charge of metal by heat generated by the passage therethrough of an induced low frequency current.

Furnaces of this character may be successfully and economically used for melting and/or refining either ferrous or non-ferrous metals in charges of approximately 100 lbs. or more each, and as the principles of inductive heating are well understood by those skilled in the art, a detailed consideration thereof herein would be superfluous.

Induction furnaces which have heretofore been employed have been relatively expensive to operate for the reason, among others, that large heat losses are incurred through radiation, convection, and conduction from the molten charge, and although in high frequency induction furnaces the evacuation of the space above the charge has heretofore been suggested in order to diminish such losses, so far as I am aware no satisfactory low frequency coreless induction furnace has heretofore been devised.

A principal object of the present invention therefore is to provide a coreless induction furnace of the low frequency type adapted to be operated from a standard commercial 220 volt 60 cycle power circuit and in which heat losses are reduced to a minimum.

A further object of my invention is to provide a coreless low frequency induction furnace in which the melting and refining of the charge is carried on under reduced pressure whereby occlusion of gases in the charge, undue loss of heat therefrom and other disadvantages are substantially avoided, and which may be satisfactorily utilized for the heating of charges exceeding 100 lbs. in weight without radiation and cooling losses disproportionate to the power input which have rendered certain types of furnaces heretofore suggested commercially impracticable from an economic standpoint for heating such charges.

Figure 1:
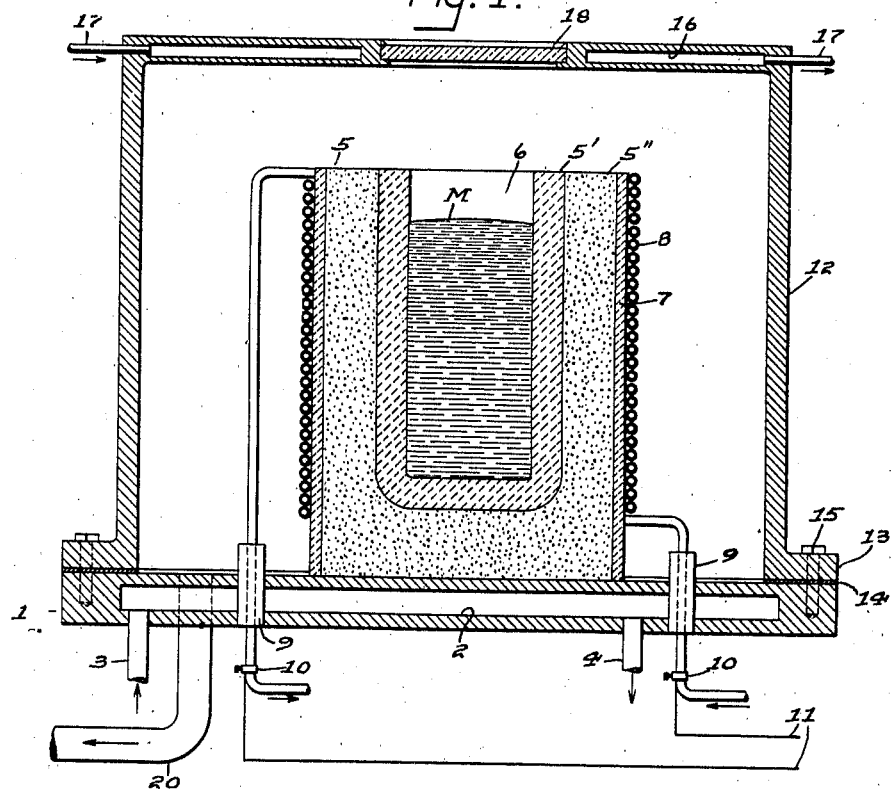
Figure 2:
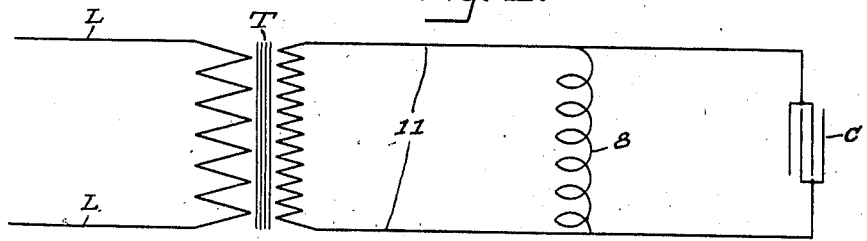

Other purposes, objects and advantages of the present invention will hereinafter more fully appear or will be understood from the following description of a preferred embodiment thereof, reference being had to the accompanying drawing in which Fig. 1 is a diagrammatic vertical central section of the furnace and Fig. 2 is a wiring diagram showing the electrical connections desirably employed. Like characters are used to designate the same parts in both figures.

Referring now more particularly to the drawing, the furnace therein shown comprises a substantially horizontal base 1 enclosing a chamber 2 through which any suitable cooling medium, such as water, may be circulated, an inlet pipe 3 being connected therewith adjacent one end and an outlet pipe 4 being arranged at a point remote therefrom to carry off the cooling fluid. The base 1 supports a desirably cylindrical melting pot generally designated as 5, and which, as shown, comprises a refractory lining 5' surrounding the chamber 6 within which the charge of metal M is placed, clay or other filling material 5'' surrounding the lining, and an outer metal jacket 7. The pot, in turn, is surrounded by an induction coil 8 formed of copper or other suitably electrically conductive tubing, the respective ends of which extend through insulators 9 disposed in the base 1, and are interconnected with a source of water supply (not shown) in such manner that water can be circulated through the coil, as indicated by the arrows in Fig. 1, for the purpose of cooling it. Suitably connected to the ends of the induction coil 8, as by means of clamps 10, are power leads 11 through which a low-frequency alternating current, desirably of the order of 500 volts 60 cycles, is supplied to the coil.

A hood or casing 12 having a flange 13 adapted to engage a suitably resilient gasket 14 carried by the base is arranged to enclose the pot 5 and its surrounding coil 8 and is removably secured to the base by means of cap screws 15, whereby the space within the hood may be hermetically sealed after the pot has been charged and the hood lowered into place thereover. The top of the hood 12 is preferably provided with an annular chamber 16 through which a cooling fluid, such as water, may be directed by means of pipes 17, and a glass or other transparent window 18 is desirably disposed centrally thereof to permit observation of the charge and the progress of the heating from the exterior of the hood.

The furnace is also provided with a pipe connection 20 preferably extending through the base 1 and connected with a suitable vacuum pump (not shown) by means of which the air within the hood may be evacuated preparatory to the heating of the charge and a vacuum maintained during the subsequent melting and/or refining operations.

In accordance with my invention the leads 11, as shown in Fig. 2, are interconnected outside the furnace with the secondary coil of a transformer T to supply the coil with suitable low frequency current, for example a 500 volt 60 cycle current, stepped up by the transformer from a commercial 220 volt 60 cycle power current supplied to the transformer by leads L, L, a condenser C and being shunted across the lines 11 in accordance with the usual practice, and it is thus apparent that a heating current may readily be induced in the charge M for the purpose of melting and/or refining the latter, while the continued operation of the vacuum pump referred to is effective to maintain suitable reduced pressure within the hood 12. As the heat insulating properties of a vacuum are well known, it will be apparent that under these conditions substantially no loss of heat from the charge by radiation, convection or conduction can take place; additionally, as both the base 1 and the top of the hood 12 are water-cooled as well as the coil 8, substantially all the heat developed in the charge is conserved while the heating of the charge under reduced pressure is effective to substantially eliminate the occlusion of gases therein.

A furnace of the character of that just described is eminently suitable, as hitherto stated, for the melting of charges exceeding 100 lbs. in weight since the low rate of current frequency employed permits a high power input while the radiation and cooling losses are very greatly minimized with resulting relatively high efficiency of the furnace as a whole. Moreover, since the current requisite for the operation of the furnace is derived from the ordinary commercial source and is used at the normal frequency, the necessity for high frequency generating equipment is obviated, thus avoiding the expense incident to its initial installation and subsequent operation. The employment of a current having approximately the voltage to which I have referred is of distinct importance for satisfactory operation of furnaces of this character as higher voltages are uneconomical on account of their tendency to cause wasteful dissipation of energy through corona effects created in the vicinity of the conductors while lower voltages may result in improper heating of the charge and other disadvantages because of the difficulty of obtaining a sufficiently large power input.

While I have herein described with considerable particularity a preferred form of my invention, it will be understood that I do not intend to limit or confine myself thereto as changes and modifications in the form and arrangement of the several parts thereof will readily occur to those skilled in the art and may be made if desired without departing from the spirit and scope of the invention as defined in the appended claims.

Having thus described my invention, I claim and desire to protect by Letters Patent of the United States:

1. An induction furnace comprising in combination a base, means for cooling the base, a melting pot disposed on the base, a coil of electrically conductive tubing around the pot, means for effecting a circulation of cooling fluid through the coil, a transformer connected in series with the coil and operative to supply the coil with a low frequency alternating current, a hood removably seated on the base and enclosing the pot, means adapted to hermetically seal the joint between the hood and the base and means operable to maintain a reduced pressure in the hood during operation of the furnace.

2. An induction furnace comprising in combination a base having a closed chamber, a melting pot disposed thereon, a coil of electrically conductive tubing, around the pot, the ends of the coil being extended through the base, means for electrically insulating said ends from the base, a transformer connected in series with the ends of the coil outside the base for supplying low frequency current thereto, means for inducing a flow of cooling fluid through the chamber, means for inducing a flow of cooling fluid through the coil, a hood removably seated on the base and having a closed chamber in its upper portion, means for inducing a flow of cooling fluid through said last mentioned chamber, means for hermetically sealing the joint between the hood and the base, and means operable to create and maintain a reduced pressure in the hood during operation of the furnace.

3. An induction furnace comprising in combination a base having a closed chamber, a melting pot disposed thereon, a coil of electrically conductive tubing surrounding the pot, the ends of the coil being extended through the base, means for electrically insulating said ends from the base, a transformer connected in series with the ends of the coil outside the base for supplying a 500 volt 60 cycle current thereto, means for inducing a flow of cooling fluid through the chamber, means for inducing a flow of cooling fluid through the coil, a hood removably seated on the base and having a closed chamber in its upper portion, means for inducing a flow of cooling fluid through said last mentioned chamber, means for hermetically sealing the joint between the hood and the base, and means operable to create and maintain a reduced pressure in the hood during operation of the furnace.

WALTER O. KREBS.